US010356877B2

(12) United States Patent
Yau

(10) Patent No.: US 10,356,877 B2
(45) Date of Patent: Jul. 16, 2019

(54) MULTI-CHANNEL INDEPENDENT CONTROL CIRCUIT OF LIGHTING POWER SUPPLY

(71) Applicant: Delight Innovative Technologies Limited, Hong Kong (CN)

(72) Inventor: Kin Hing Yau, Hong Kong (CN)

(73) Assignee: Delight Innovative Technologies Limited, Hong Kong (CN)

( * ) Notice: Subject to any disclaimer, the term of this patent is extended or adjusted under 35 U.S.C. 154(b) by 0 days.

(21) Appl. No.: 15/767,793

(22) PCT Filed: Oct. 17, 2016

(86) PCT No.: PCT/CN2016/102284
§ 371 (c)(1),
(2) Date: Apr. 12, 2018

(87) PCT Pub. No.: WO2017/063606
PCT Pub. Date: Apr. 20, 2017

(65) Prior Publication Data
US 2018/0338366 A1 Nov. 22, 2018

(30) Foreign Application Priority Data
Oct. 16, 2015 (CN) .......................... 2015 1 0674463

(51) Int. Cl.
*H05B 33/08* (2006.01)
*H05B 37/02* (2006.01)
(Continued)

(52) U.S. Cl.
CPC ............ *H05B 37/02* (2013.01); *H02M 3/285* (2013.01); *H05B 33/0815* (2013.01);
(Continued)

(58) Field of Classification Search
CPC ............ H05B 33/0815; H05B 33/0818; H05B 33/0827; H05B 33/0845; H05B 33/0851
(Continued)

(56) References Cited

U.S. PATENT DOCUMENTS 6,888,529 B2 * 5/2005 Bruning ............... G09G 3/3413
345/102
9,000,673 B2 * 4/2015 Feng .................. H05B 33/0839
315/186

(Continued)

FOREIGN PATENT DOCUMENTS

CN 101902139 A 12/2010
CN 101951713 A 1/2011
(Continued)

OTHER PUBLICATIONS

International Search Report from PCT Application No. PCT/CN2016/102284 including its English-language translation, dated Dec. 28, 2016, 7 pages.

(Continued)

*Primary Examiner* — Tung X Le
(74) *Attorney, Agent, or Firm* — Harness, Dickey & Pierce, P.L.C.; Anthony G. Fussner

(57) ABSTRACT

The invention provides a multi-channel independent control circuit of lighting power supply, including a power supply control circuit, a transformer, a main current rectifier circuit, a feedback circuit and a main current output circuit, and also including one or more secondary side units. The secondary side unit includes secondary windings, secondary side rectifier circuit, secondary side output circuit, switching circuit, detector and logic control circuit, the secondary side winding is couple to the primary winding, the secondary side rectifier circuit and the secondary side output circuit are sequentially connected in parallel across the loop of the secondary winding, the detector is disposed in the secondary (Continued)

side output circuit and an output end of the detector is connected to an input end of the switching circuit through the logic control circuit. An output end of the switching circuit is connected to the secondary side output circuit. The invention relates to the multi-channel independent control circuit of lighting power supply, realizing independent and normal operation of multiple lighting apparatus or devices, and improving the flexibility, reliability and safety of the entire lighting system.

8 Claims, 3 Drawing Sheets

(51) Int. Cl.
*H02M 3/28* (2006.01)
*H05B 39/04* (2006.01)
*H05B 41/282* (2006.01)

(52) U.S. Cl.
CPC ..... *H05B 33/0827* (2013.01); *H05B 33/0851* (2013.01); *H05B 39/04* (2013.01); *H05B 41/2827* (2013.01)

(58) Field of Classification Search
USPC ........................................ 315/276, 294, 312
See application file for complete search history.

(56) References Cited

U.S. PATENT DOCUMENTS

| 2010/0237799 | A1 | 9/2010 | Choi et al. | |
| 2012/0146530 | A1* | 6/2012 | Han | H05B 33/0815 315/219 |
| 2012/0286678 | A1* | 11/2012 | Wu | H05B 33/0815 315/188 |
| 2012/0299483 | A1* | 11/2012 | Lethellier | H05B 33/0815 315/121 |
| 2014/0312789 | A1* | 10/2014 | Feng | H02M 3/33507 315/186 |
| 2015/0289331 | A1* | 10/2015 | Chen | H05B 33/0815 315/186 |

FOREIGN PATENT DOCUMENTS

| CN | 101998730 A | 3/2011 |
| CN | 102316620 A | 1/2012 |
| CN | 102625512 A | 8/2012 |

OTHER PUBLICATIONS

Written Opinion stating claims 1-8 lack inventive step from PCT Application No. PCT/CN2016/102284, dated Dec. 28, 2016, 3 pages.

* cited by examiner

MULTI-CHANNEL INDEPENDENT CONTROL CIRCUIT OF LIGHTING POWER SUPPLY

This patent application is a U.S. national stage filing under 35 U.S.C. § 371 of International Application No. PCT/CN2016/102284 filed Oct. 12, 2016 (published as WO 2017/063606 on Apr. 20, 2017), which claims priority of Chinese application No. CN201510674463.0 filed Oct. 16, 2015. The disclosures of the applications identified in this paragraph are incorporated herein by reference in their entirety.

TECHNICAL FIELD

The invention relates to the technical field of lighting power supply control, and in particular to a multi-channel independent control circuit of a lighting power supply.

BACKGROUND TECHNIQUE

A lighting driving power supply (for example, a LED driving power supply) refers to a power converter that converts a power supply (for example, high voltage and industrial frequency AC i.e., mains, low voltage and high frequency AC such as the output of an electronic transformer, etc.) into specific voltage and current to drive a lighting apparatus or device to work (e.g. LED lighting), that is, to convert the power supply through a device such as a transformer to a rated power suitable for the operation of the lighting apparatus or device. At present, there are two ways to supply power to lighting apparatus or devices. One is to use a plurality of power supplies to separately power a plurality of lighting apparatus or devices. In this way, because each lighting apparatus or device has its own power supply, the combination method is flexible. Even if an apparatus or device fails, the operation of other apparatus or devices will not be affected. Therefore, the reliability and safety are high. However, due to the use of a plurality of power supplies and the need for supporting of related peripherals, the cost is higher. The other is to use one power supply to power one or more lighting apparatus or devices. Each lighting apparatus or device is connected in series or in parallel to the output circuit of the power supply that converts the voltage through the transformer. In this way, the cost is lower because only one power supply is used. However, this approach is less flexible. And when a plurality of lighting apparatus or devices are connected in series, once one of the lighting apparatus or devices fails, all lighting apparatus or devices will be affected and operational failures will occur. In practical applications, the above two ways to supply power can be used concurrently to achieve a balance between cost and performance. However, they do not fundamentally solve the problems existing in the current methods of lighting power supply.

A schematic diagram of the structure of a conventional lighting power supply control circuit applied to the above lighting power supply mode is shown in FIG. 1. The circuit includes a circuit (power supply control circuit) for controlling the power supply for the input power supply, a transformer, a rectifier circuit, a feedback circuit (FB), and an output circuit (such as a capacitor $C_1$ and a resistor $R_1$ connected in parallel in FIG. 1). The transformer includes a primary winding $L_0$ and a secondary winding $L_1$ coupled to each other. The rectifier circuit, the feedback circuit FB, and the output circuit (capacitor $C_1$ and resistor $R_1$) are connected in parallel across the loop of the secondary winding $L_1$. The output of the feedback circuit FB is also connected to the power supply control circuit. The power supply control circuit only drives at the source of the power supply. It generally uses Pulse Width Modulation (PWM) to control the power supply. As described above, when a lighting power control circuit of this type is applied to lighting power supply, one or more lighting apparatus or devices (for example, one or more LED lights) can only be connected in series to the output of the loop of the secondary winding $L_1$. If one of the lighting apparatus or devices fails, all lighting apparatus or devices will be affected and an operational failure will occur. This in turn means that the entire lighting power supply has hidden problems of reliability and safety.

SUMMARY OF THE INVENTION

The invention aims at the problems of the existing lighting power supply control circuit that the application of multiple power supplies lead to high cost, that the use of one power supply will affect all the lighting apparatus or devices so as to be prone to operational failures, and that there are hidden problems of reliability and safety. A multi-channel independent control circuit of lighting control power supply is proposed, which can use only one power supply to drive multiple lighting apparatus or devices, so that it is possible that multiple lighting apparatus or devices do not affect each other and are independent, while the lighting apparatus or devices can work normally. The reliability and safety of the entire lighting system can be greatly improved.

The technical solution of the invention is as follows:

A multi-channel independent control circuit of a lighting power supply, including a power supply control circuit, a transformer, a main current rectifier circuit, a feedback circuit, and a main current output circuit. The transformer includes a primary winding and a secondary winding coupled to each other, the main current rectifier circuit, the feedback circuit and the main current output circuit are sequentially connected in parallel across the loop of the secondary winding, and an output end of the feedback circuit is also connected to the power supply control circuit, the multi-channel independent control circuit further includes one or more secondary side units, the secondary side unit includes a secondary side winding, a secondary side rectifier circuit, a secondary side output circuit, a switching circuit, a detector and a logic control circuit, the secondary side winding is couple to the primary winding in the transformer, the secondary side rectifier circuit and the secondary side output circuit are sequentially connected in parallel across the loop of the secondary winding, the detector is disposed in the secondary side output circuit and an output end of the detector is connected to an input end of the switching circuit through the logic control circuit, an output end of the switching circuit is connected to the secondary side output circuit.

The power supply control circuit is a pulse width modulation circuit.

The switching circuit in the secondary side unit is a MOS transistor.

The secondary side output circuit in the secondary side unit includes an output capacitor and a resistor connected in parallel, and the detector is disposed on the branch where the resistor is located.

The logic control circuit in the secondary side unit is an inverter.

The output voltage of the secondary side unit is set higher than a rated voltage of 5-15%.

The secondary side unit further includes a secondary side first inductor, the secondary side first inductor and the secondary side output circuit are connected in series and then they are provided on the loop of the secondary side winding.

The secondary side unit also includes a secondary side second inductor and a balanced capacitor, and the secondary side second inductor and the secondary side first inductor are coupled to each other and are wound on an same magnetic core, a dotted terminal of the secondary side first inductor is a current input terminal, a dotted terminal of the secondary side second inductor is connected to the balanced capacitor, and the secondary side second inductor is connected in series with the balanced capacitor and they are connected in parallel with the output capacitor of the secondary side output circuit.

The technical effects of the invention are as follows:

The invention provides a multi-channel independent control circuit of a lighting power supply, including a power supply control circuit, a transformer, a main current rectifier circuit, a feedback circuit and a main current output circuit, and also including one or more secondary side units. The secondary side unit includes a secondary side winding, a secondary side rectifier circuit, a secondary side output circuit, a switching circuit, a detector and a logic control circuit. The secondary side winding and the primary winding are coupled to each other (when a plurality of secondary side units are used, the secondary side windings of all secondary side units are all coupled to the primary winding). The secondary side rectifier circuit and the secondary output circuit are sequentially connected in parallel across the loop of the secondary side winding. The detector is disposed in the secondary side output circuit and an output end of the detector is connected to an input of the switching circuit through the logic control circuit. An output end of the switching circuit is connected to the secondary side output circuit. In applications where the lighting power supply is applied, for example, to power LED lighting, if there are two or more LED loads, the normal transformer usually provides power supply for the most real load (i.e., the rated power maximum load). So when there are two or more different load outputs, it is usually more difficult to use the same transformer to provide the power supply. Since the normal power supply outputs a constant voltage via the transformer, a substantially constant voltage can be obtained in a scaling ratio manner (that is, other scaling ratio proportion voltage values are obtained basically on a stable constant voltage basis). However, in the case of a lighting power supply of such as an LED load, since the load voltage of the LED is related to power (i.e., current), it is not suitable to use a scaling ratio to drive a plurality of loads. And each LED (for example, each LED light string) may have a different load voltage. Even if the voltage change is small, it may be very large for the LED driver. Therefore, for this reason, the LED driver is also not suitable for using the scaling ratios to drive a plurality of loads. Therefore, according to the circuit structure of the invention, one or more secondary side units of a specific structure are provided on the basis of using one transformer, thereby forming an unique circuit structure of 1 transformer+1 main current unit (a main current rectifier circuit, a feedback circuit, and a main current output circuit)+N secondary side units (N≥1). A simple switching circuit, a detector, and a logic control circuit are added to the secondary side unit so that the auxilliary LED light string is driven by the output of the loop of the secondary side winding (the main LED light string is driven by the main current). In the secondary side unit, the detector detects whether the load current in the secondary side output circuit has satisfied the requirement, thereby controlling the switching circuit to be on and off. The feedback signal is transmitted by the feedback circuit in the main current unit itself to the power supply control circuit for performing the power supply control over the input power supply, so as to implement the power supply for every loads of the main current unit and the secondary side unit (or a plurality of secondary sides). In this way, only one power supply can be used to drive a plurality of LED light strings, so that the LEDs can work independently at the rated power while being able to realize that the multiple LED light strings are independent of each other. It greatly increases the flexibility, reliability and safety of the entire lighting system.

Further, the secondary side unit may also include a secondary side first inductor. That is, the secondary first inductor and the secondary output circuit are connected in series and then they are provided on the loop of the secondary side winding. The secondary side first inductor can further achieve the effect of the power supply ripple suppression. It is also preferable to realize a composite super-inductance inductor having an effective inductance higher than about 100 times the general inductance. The secondary side first inductor can ensure the stability of the current when the switching circuit is switched on and off. Further preferably, it is also possible to provide a secondary side second inductor and a balanced capacitor specifically connected with each other in the secondary side unit. The secondary side second inductor and the secondary side first inductor are coupled to each other to form a coupled inductor and they are wound around the same magnetic core together to achieve the high-efficiency self-coupling, thereby achieving a highly effective filtering effect. After the power is turned on, the voltage of the secondary side first inductor and its induced voltage on the secondary side second inductor are reversed. The current that the input voltage of the power input adds on the first inductor and the current that the induced voltage decreases on the second inductor may offset each other. In this way, the DC power supply can be completely removed by the load of the subsequent secondary side output circuit (or the load connected to the secondary side output circuit), so that the AC ripple can be completely canceled, i.e., high reliability and high efficiency power supply ripple suppression can be achieved. And using this special coupled inductor, even with a very small value of the output capacitor, it is possible to effectively suppress the power supply ripple, so as to reduce the circuit size and reduce circuit losses and product costs. Additionally, the circuit also uses a balanced capacitor. It objectively creates a reverse AC ripple to offset the original ripple to achieve near-DC power output, thereby further achieving high reliability and high efficiency power supply ripple suppression. The safety and reliability of the multi-channel independent control circuit of the lighting power supply according to the invention are further guaranteed.

DETAILED DESCRIPTION OF EMBODIMENTS

The present invention will be described below with reference to the accompanying drawings.

Figure 2:
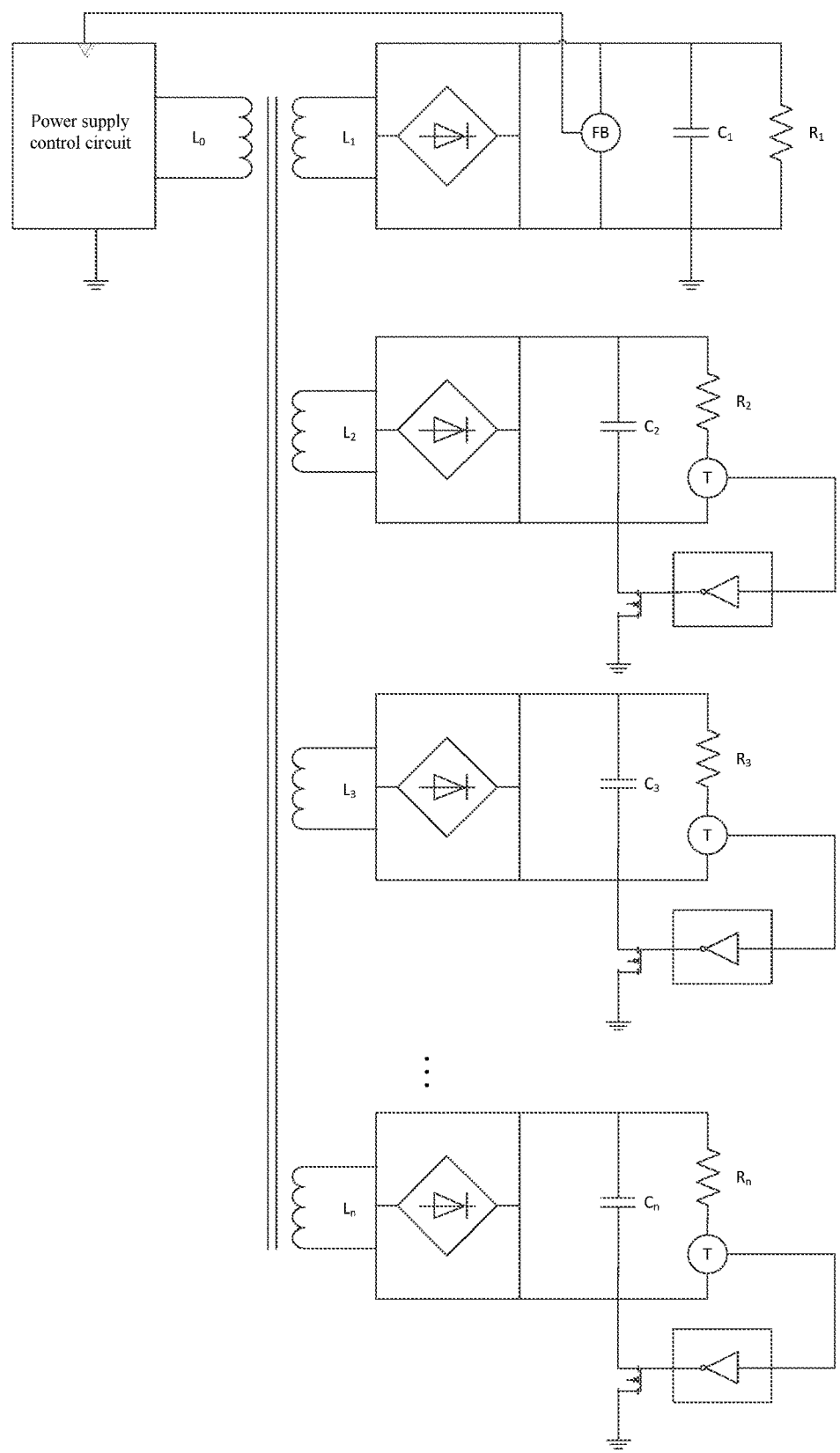
FIG. 2 is a schematic diagram of the structure of a multi-channel independent control circuit of a lighting power supply according to the present invention.

The present invention relates to a multi-channel independent control circuit of a lighting power supply. The schematic diagram of the circuit structure is shown in FIG. 2, including a circuit (power supply control circuit) for supplying energy to an input power supply, a transformer, a main current rectifier circuit, and a feedback circuit. (FB) and a main current output circuit (an output capacitor $C_1$ and a resistor $R_1$ connected in parallel as shown in FIG. 2). The transformer includes a primary winding $L_0$ and a secondary winding $L_1$ coupled to each other. The main current rectifier circuit, the feedback circuit FB, and the main current output circuit (the output capacitor $C_1$ and the resistor $R_1$) are sequentially connected in parallel across the loop of the secondary winding $L_1$. And the output end of the feedback circuit FB is also connected to the power supply control circuit. The multi-channel independent control circuit also includes N secondary side units (N÷1, which may be simply referred to as a first secondary side, a second secondary side, . . . an Nth secondary side). Each secondary side unit includes a secondary winding, a secondary side rectifier circuit, a secondary side output circuit, a switching circuit, a detector, and a logic control circuit. The secondary side windings include a secondary side winding $L_2$, a secondary side winding $L_3$, . . . , a secondary side winding $L_n$, n≥2, as shown in FIG. 2. The secondary side output circuits include an output capacitor $C_2$ and a resistor $R_2$ connected in parallel with the first secondary side, an output capacitor $C_3$ and a resistor $R_3$ connected in parallel with the second secondary side, . . . , an output capacitor $C_n$ and a resistor $R_n$ connected in parallel with the Nth secondary side, as shown in FIG. 2. The switching circuits, as shown in FIG. 2, are implemented using MOS transistors. All the secondary side windings (ie the secondary side winding $L_2$, the secondary side winding $L_3$, . . . the secondary side winding $L_n$) are coupled to the primary winding $L_0$ in the transformer. The secondary side rectifier circuit and the secondary side output circuit of each secondary side unit are connected in parallel across the loop of the secondary side winding of the secondary side. And the detector T in each secondary side unit is set in the secondary side output circuit of the respective secondary side unit. According to this embodiment, the detector T is provided on the branch of the corresponding resistor ($R_2$, $R_3$ . . . $R_n$) in the secondary side output circuit. The output end of the detector T is connected via the logic control circuit (is an inverter, as shown in FIG. 2) to the input end of the switching circuit of its associated secondary side unit. The output end of the switching circuit is connected to the secondary side output circuit of its associated secondary side unit.

Preferably, the power supply control circuit may be a pulse width modulation circuit and uses a pulse width modulation method to control the power supply. The switching circuit may be a MOS transistor (a PMOS transistor or an NMOS transistor), or may be a combination switching circuit of one or more PMOS transistors and NMOS transistors. The logic control circuit may be an inverter, or it may be a combination logic circuit of one or more inverters, AND gates, OR gates, and/or other such logic gates.

Figure 3:
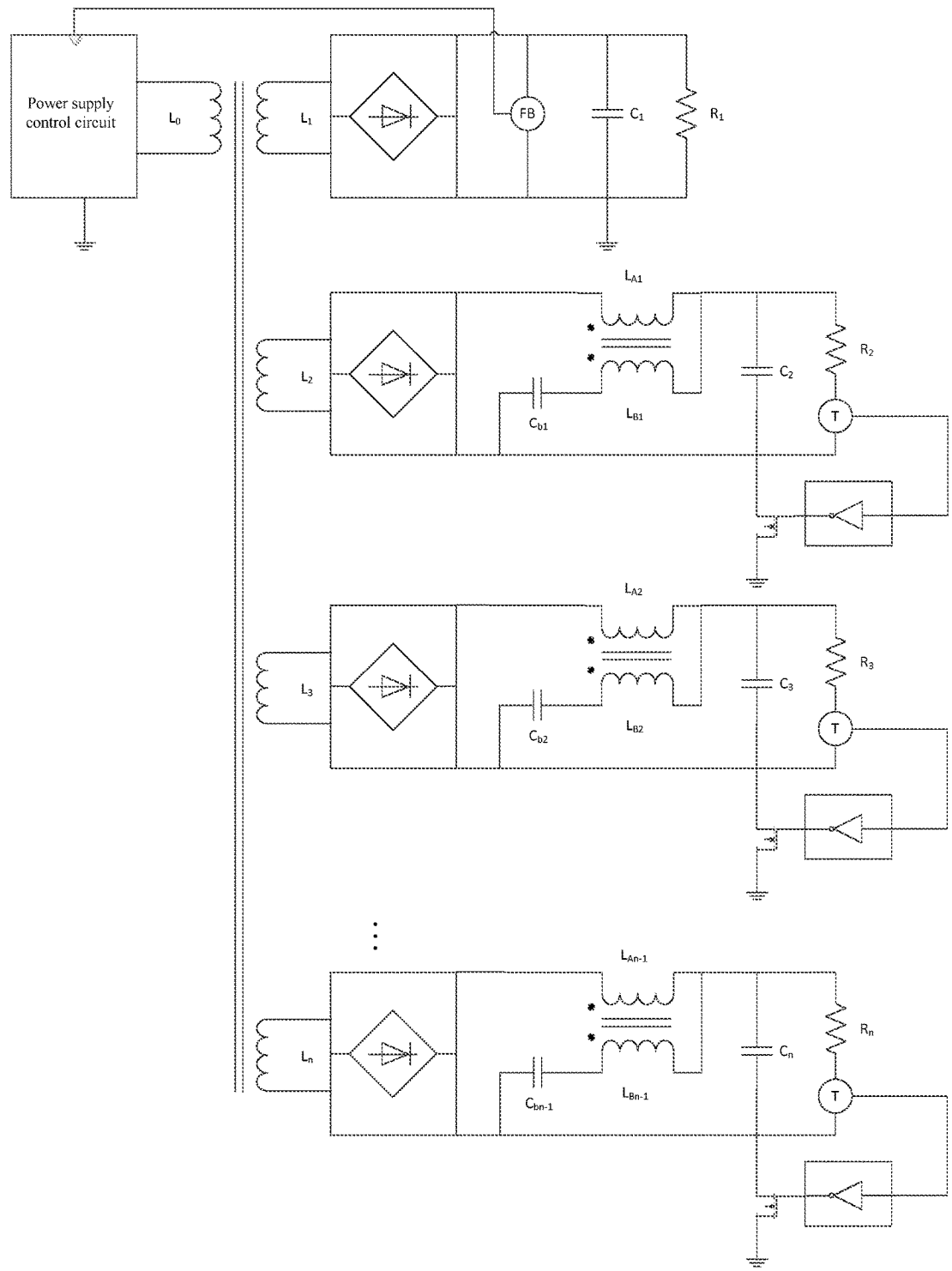
FIG. 3 is a schematic diagram of a preferred structure of a multi-channel independent control circuit of a lighting power supply according to the present invention.

Further preferably, each secondary side unit may further include a secondary side first inductor, that is, the secondary side first inductor and the secondary side output circuit are connected in series, and then they are provided on the loop of the corresponding secondary side winding. As shown in the preferred structure diagram of the multi-channel independent control circuit of the lighting power supply according to the present invention as shown in FIG. 3, the secondary side first inductors are $L_{A1}$, $L_{A2}$ . . . $L_{An-1}$. The secondary side unit according to this embodiment also includes a secondary side second inductor ($L_{B1}$, $L_{B2}$ . . . $L_{Bn-1}$ shown in FIG. 3) and a balanced capacitor ($C_{b1}$, $C_{b2}$ . . . $C_{bn-1}$ shown in FIG. 3). In each of the secondary side units, the secondary side second inductor and the secondary side first inductor are coupled to each other and wound around the same core. A dotted terminal of the secondary side first inductor is the current input terminal. A dotted terminal of the secondary side second inductor is connected to the balanced capacitor. The secondary side second inductor is connected in series with the balanced capacitor and they are connected in parallel with the output capacitor. For example, in the first secondary side, the secondary side second inductor $L_{B1}$ and the secondary side first inductor $L_{A1}$ are coupled to each other and wound on the same magnetic core. A dotted terminal of the secondary side first inductor $L_{A1}$ is the current input terminal. A dotted terminal of the secondary side second inductor $L_{B1}$ is connected to the balanced capacitor $C_{b1}$. The secondary side second inductor $L_{B1}$ is connected in series with the balanced capacitor $C_{b1}$ and they are connected in parallel with the output capacitor $C_2$.

Figure 1:
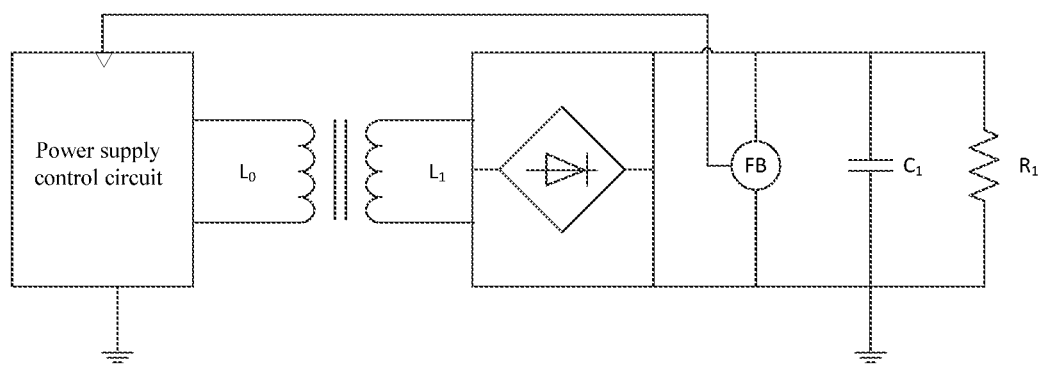
FIG. 1 is a schematic diagram of a structure of a conventional lighting power supply circuit.

The operating principle of the multi-channel independent control circuit of the lighting power source according to the invention will be explained as follows:

In applications where the lighting power supply is applied, for example, to power LED lighting, if there are two or more LED loads, two or more secondary side unit outputs as shown in FIG. 2 need to be provided. The output end of the secondary output circuit in the secondary unit may be connected to the LED load. It can also be understood that the resistors ($R_2$, $R_3$, . . . $R_n$) in the secondary side output circuits are equivalent LED load resistors. Similarly, the output end of the main current output circuit can also be connected to the LED load. Or it is understood that the resistor ($R_1$) in the main current output circuit is an equivalent LED load resistor. For example based on the conventional LED single-channel constant current control (hereinafter referred to as the main current) as shown in FIG. 1, the multi-channel independent control circuit of the lighting power supply according to the present invention is added one (e.g., the first secondary side as shown in FIG. 2), two (e.g., the first secondary side and the second secondary side as shown in FIG. 2) or multiple secondary side units (e.g., the first secondary side, the second secondary side, . . . , the Nth secondary side as shown in FIG. 2). The secondary side rectifier circuit of the secondary side unit may have the same structure as that of the main current rectifier circuit. And a simple switching circuit, a detector and a logic control circuit are added on the secondary side, so that the auxilliary LED light string is driven through the loop output of the secondary side winding (the main LED light string is driven by the main current). This can meet the requirements of precision while meeting the constant current driving requirements of the auxilliary LED light string. At the same time, the main LED light string driven by the main current constant current is not affected. Drive precision requirements are also satisfied. In order to achieve the above functions, the secondary side as shown in FIG. 2 can be used. A simple switching circuit is added to the secondary side. The switching circuit is connected to the secondary side output circuit and cooperates with the devices such as a detector and a logic control circuit to work together. And the secondary side and the main current are respectively grounded (that is, the secondary side is not connected to the mains current ground, but is separately connected to the ground of the secondary side to enhance the independence of the secondary side and the main current). In addition, the secondary side output voltage is set to be 5-15% higher than its rated voltage. Preferably, the value can be set to exceed 5%, 10% or 15%.

The operating principle of the multi-channel independent control circuit of the lighting power supply that adds one secondary side unit (such as the first secondary side) is as follows: After the power is turned on, at this time, because the load of the first secondary side does not satisfy the current demand, the switching circuit is always in the ON state. The stable constant voltage output by the first secondary side winding $L_2$ and the secondary rectifier circuit is charging the output capacitor (or load capacitor) $C_2$ of the secondary side output circuit until the load current of the secondary side output circuit meets the requirement (the output voltage is higher than its rated voltage by 5-15%, preferably the value can be set beyond 5%, 10% or 15%). When the detector T detects that the load current has satisfied the requirement, the switching circuit is turned off. At this time, the load capacitor $C_2$ is discharged continuously. When the detector T detects that the load current is lower than the requirement, the switching circuit is turned on again to charge the load capacitor $C_2$ of the first secondary side output circuit. In this way, the load driving power of the secondary side can be realized. In the multi-channel independent control circuit of the lighting power supply according to the invention, the main target of each charge is that the main current meets the rated demand. The second secondary side is only passively filled. So the secondary side does not cause the main current to stop. Conversely, the power supply voltage (i.e., the primary winding side) must control the power supply mainly on the basis of the main current. In practical applications, the power supply voltage (i.e., the primary winding side) simultaneously charges the load capacitors of the respective output circuits of the main current and the first secondary side. The amount of charge depends on the value of the respective load capacitors. Therefore, suitable capacitance value can be set according to actual needs. The output capacitor $C_2$ (or load capacitor) of the secondary side output circuit in the secondary side unit is much smaller than the main current output capacitor $C_1$, for example, 10 times or more. It is also preferable that the switching circuit is turned on for 60-80% of the time (the difference in the inductance values of the secondary side windings, the difference in the values of the LED voltages, etc. are reflected in the switching circuit ON time). Additionally, when a multi-channel independent control circuit of the lighting power supply according to the invention is actually applied, since there is almost no impedance on the first secondary side (such as the MOS transistor switching circuit shown in FIG. 2, since there is only a full on-resistance, its impedance can be negligible), and no other capacitors or inductors consume power, the secondary side efficiency is almost the same as the main current. No major secondary energy loss occurs.

Referring to the embodiment shown in FIG. 3, each secondary side unit is preferably provided with a specifically connected secondary side first inductor ($L_{A1}$, $L_{A2}$ ... $L_{An-1}$), a secondary side second inductor ($L_{B1}$, $L_{B2}$ ... $L_{Bn-1}$) and a balanced capacitor ($C_{b1}$, $C_{b2}$ ... $C_{bn-1}$). This structure can further achieve the effect of power supply ripple suppression. It is also preferable to realize a composite super-inductance inductor having an effective inductance higher than about 100 times the general inductance. Therefore, when the switching circuit is in the on state, the effect that the current is slowly increased can be achieved. And when the switching circuit is off, the secondary side inductor can slow down the speed of the current reduction (just the speed of current reduction is slowed, but the overall current is also reduced). Therefore, the secondary side first inductor, the secondary side second inductor, and the balanced capacitor work together to achieve an AC bypass function of the load capacitor. The current on the load is basically DC. After the power is turned on, the voltage on the secondary side first inductor and the induced voltage on the secondary side second inductor are reversed. The current added to the first inductor by the input voltage on the input terminal of the power supply and the current reduced on the second inductor by the induced voltage can offset each other. As such, the DC power supply can be completely removed by the load of the subsequent secondary side output circuit (or the load connected to the secondary side output circuit). The AC ripple can be completely canceled, i.e., high reliability and high efficiency power supply ripple expression can be achieved. The balanced capacitors create a reverse AC ripple to offset the original ripple to achieve near-DC power output, further achieving high reliability and high efficiency power supply ripple expression. It is guaranteed that the current is stable when the switching circuit is turned on and off. It is possible to further ensure the operation safety and reliability of the multi-channel independent control circuit of the lighting power supply according to the present invention.

In this way, the operating principle of the multi-channel independent control circuit of the lighting power supply with two or more secondary sides added (as shown in FIG. 2) is the same as the operating principle of the multi-channel independent control circuit of the lighting power supply with one secondary side added as described above. And every secondary sides are self-sufficient, independent and without affect on each other.

It should be noted that the above-described embodiments may make those skilled in the art more fully understand the invention, but do not limit the invention in any way. Therefore, although the present specification has been described in detail with reference to the accompanying drawings and embodiments, it should be understood by those skilled in the art that the invention can still be modified or equivalently replaced. In short, all technical solutions and improvements that do not deviate from the spirit and scope of the present invention shall all be covered by the protection scope of the present patent.

The invention claimed is:

1. A multi-channel independent control circuit of a lighting power supply, including a power supply control circuit, a transformer, a main current rectifier circuit, a feedback circuit, and a main current output circuit, the transformer includes a primary winding and a secondary winding coupled to each other, the main current rectifier circuit, the feedback circuit and the main current output circuit are sequentially connected in parallel across the loop of the secondary winding, and an output end of the feedback circuit is also connected to the power supply control circuit, the multi-channel independent control circuit further includes one or more secondary side units, the secondary side unit includes a secondary side winding, a secondary side rectifier circuit, a secondary side output circuit, a switching circuit, a detector and a logic control circuit, the secondary side winding is couple to the primary winding in the transformer, the secondary side rectifier circuit and the secondary side output circuit are sequentially connected in parallel across the loop of the secondary winding, the detector is disposed in the secondary side output circuit and an output end of the detector is connected to an input end of the switching circuit through the logic control circuit, an output end of the switching circuit is connected to the secondary side output circuit;
    wherein the secondary side output circuit in the secondary side unit includes an output capacitor and a resistor connected in parallel, and the detector is disposed on the branch where the resistor is located;
    wherein the secondary side unit further includes a secondary side first inductor, the secondary side first inductor and the secondary side output circuit are connected in series and then the secondary side first inductor and the secondary side output circuit are provided on the loop of the secondary side winding; and
    wherein the secondary side unit also includes a secondary side second inductor and a balanced capacitor, and the secondary side second inductor and the secondary side first inductor are coupled to each other and are wound on an same magnetic core, a dotted terminal of the secondary side first inductor is a current input terminal, a dotted terminal of the secondary side second inductor is connected to the balanced capacitor, and the secondary side second inductor is connected in series with the balanced capacitor and the secondary side second inductor and the balanced capacitor are connected in parallel with the output capacitor of the secondary side output circuit.

2. The multi-channel independent control circuit of the lighting power supply according to claim 1, wherein the power supply control circuit is a pulse width modulation circuit.

3. The multi-channel independent control circuit of the lighting power supply according to claim 2, wherein the switching circuit in the secondary side unit is a MOS transistor.

4. The multi-channel independent control circuit of the lighting power supply according to claim 2, wherein the logic control circuit in the secondary side unit is an inverter.

5. The multi-channel independent control circuit of the lighting power supply according to claim 2, wherein the output voltage of the secondary side unit is set higher than a rated voltage of 5% to 15%.

6. The multi-channel independent control circuit of the lighting power supply according to claim 1, wherein the switching circuit in the secondary side unit is a MOS transistor.

7. The multi-channel independent control circuit of the lighting power supply according to claim 1, wherein the logic control circuit in the secondary side unit is an inverter.

8. The multi-channel independent control circuit of the lighting power supply according to claim 1, wherein the output voltage of the secondary side unit is set higher than a rated voltage of 5% to 15%.

* * * * *